Figure 1:
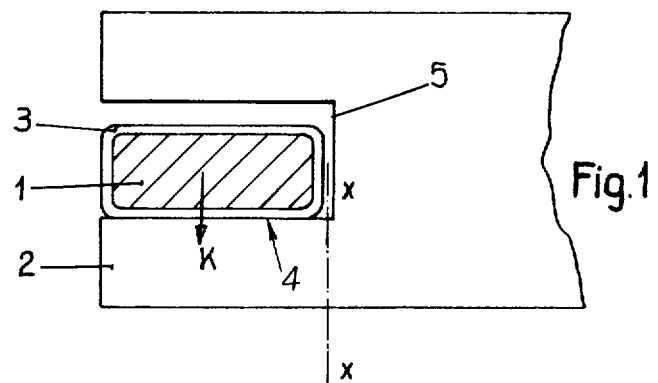

United States Patent [19]
Heil

[11] 3,899,705
[45] Aug. 12, 1975

[54] SHRINK-RING COMMUTATOR SEGMENT ASSEMBLY

[75] Inventor: Werner Heil, Birr, Switzerland

[73] Assignee: BBC Aktiengesellschaft Brown Boveri & Cie., Baden, Switzerland

[22] Filed: May 17, 1973

[21] Appl. No.: 361,224

Related U.S. Application Data

[63] Continuation of Ser. No. 253,132, May 15, 1972, abandoned.

[30] Foreign Application Priority Data
June 3, 1971  Switzerland..................... 8098/71

[52] U.S. Cl. ............................... 310/235; 310/236
[51] Int. Cl. ............................................ H01r 39/16
[58] Field of Search ........................ 310/233–238

[56] References Cited
UNITED STATES PATENTS

| | | | |
|---|---|---|---|
| 1,506,756 | 9/1924 | Kempton | 310/235 |
| 1,816,629 | 7/1931 | Werner | 310/235 |
| 2,606,220 | 8/1952 | Labastie | 310/236 |
| 2,606,221 | 8/1952 | Heintz | 310/236 |
| 3,073,980 | 1/1963 | Hoover | 310/236 |
| 3,192,424 | 6/1965 | Jones | 310/236 |
| 3,483,413 | 12/1969 | Logan | 310/215 X |
| 3,500,094 | 3/1970 | Gilbert | 310/236 |

*Primary Examiner*—Donovan F. Duggan
*Attorney, Agent, or Firm*—Pierce, Scheffler & Parker

[57] ABSTRACT

An electrical commutator component of a dynamo-electric machine consists of a cylindrical assembly of commutator segments secured by a shrink-ring. In order to electrically insulate the shrink-ring from the voltage carrying commutator segments, the entire surface of the ring is covered by insulation material prior to being heated and shrunk onto the surface of the commutator segment assembly. The insulation material can be in the form of a band which is wrapped around the ring.

3 Claims, 2 Drawing Figures

SHRINK-RING COMMUTATOR SEGMENT ASSEMBLY

This is a continuation, of application Ser. No. 253,132 filed May 15, 1972, now abandoned.

The present invention relates to an improvement in the construction of an electrical commutator component of a dynamoelectric machine, the commutator being of the so-called shrinkring type in which the cylindrical assembly of commutator segments is held together by application of a shrink-ring, the ring being received, for example, in an axially-extending open-sided groove provided in the segment assembly in a heated, expanded state and shrunk-on as it cools.

With such a commutator structure, the shrink-ring must be electrically insulated from the commutator segment assembly, i.e. the voltage carrying part, and this insulation must be so dimensioned as to be capable of withstanding the electrical and also the mechanical stresses imposed upon it during normal operation of the electrical machine to which it is applied, as well as in testing.

For example, it is known to provide such insulation in the form of annular ducts, open on the side and made from paper, or mica. This expedient suffers from the disadvantage that for manufacturing reasons, such annular ducts must have a relatively large wall thickness and must also have wide manufacturing tolerances. The mechanical pre-stress produced by the shrink-ring is therefore either insufficient, or undefined, or an auxiliary shrink-ring must be utilized in order to compensate for these defects. The last mentioned expedient is particularly complex in the case where the shrink-rings are inserted laterally into a groove provided in the cylindrical assembly of commutator segments since these rings take up a considerable amount of space, a disadvantage which leads to quite high and heavy commutator segments.

As another expedient of providing the necessary insulation between shrink-ring and commutator segment assembly, only the inner surface of the shrink-ring at which shrinking contact is made is provided with a thin and compression-resistant and accurately dimensioned insulating layer, the distances between the remaining uninsulated surface areas of the shrink-ring and the voltage carrying parts being made so large that there is no danger of a flashover at these bare metal surfaces of the shrink-ring either during testing of the commutator, or while it is in normal operation. A particularly large distance from the voltage carrying parts must be observed in the axial direction since slight discharges at the commutator segments will cause flashovers to occur across the shrink-ring insulation at voltages which are lower than a flashover over the same distance. Accordingly, this expedient to the insulating problem suffers from the disadvantage that the lever arm of the force exerted by the shrink-ring onto the lower commutator segment lug becomes greater. Accordingly, the bending moment increases and the stress on the commutator segments therefore also increases. To prevent the segments from being plastically deformed, it is thus necessary for the segments to be made taller, i.e. in the radial direction, which thus results in a heavier and more expensive construction.

The primary objective of the present invention is to provide an improved expedient for satisfactorily insulating the shrink-ring from the voltage-carrying parts of the commutator segment assembly and is achieved in that the entire surface area of the shrink-ring is covered by insulation material prior to being shrunk on to the surface of the cylindrical commutator segment assembly. In a particular form of the invention the insulation is established by winding onto the shrink-ring a band of insulating material.

In the case where higher voltages are involved, it can be advantageous if the insulating material completely covering all surface areas of the shrink-ring is comprised of at least two layers, the layer in contact with the surface of the shrink-ring being made of mica or mica-containing paper.

In order to avoid possible damage to the insulation layer of mica or mica-containing paper when the insulating material is applied to the shrink-ring, it can be advantageous to use a laminated material consisting of three layers, the inner layer being composed of the mica or mica-containing paper, and the two outer layers being composed of a plastics, e.g. polyimide.

Figure 2:
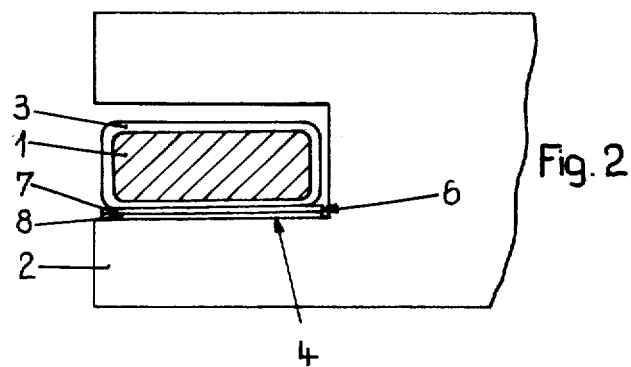

The inventive concept will become more apparent from the following detailed description of two embodiments and from the accompanying drawings wherein:

FIG. 1 is a view of a portion of a cylindrical commutator segment assembly wherein the shrink-ring insulated in accordance with the invention is of the so-called internal type; and FIG. 2 is a view similar to FIG. 1 but showing a modification where, in addition to the completely insulated shrink-ring, additional insulation is provided between the inner surface of the shrink-ring and the cylindrical contacting surface of the commutator segment assembly to which the shrinking pressure is applied in the radially inward direction.

With reference now to FIG. 1, in order to insulate the metallic shrink-ring 1 relative to the voltage-carrying cylindrical commutator segment assembly 2, the bare metal of the ring is first covered completely with an insulation 3 prior to being heated and shrunk onto the contacting surface of the commutator segment assembly. The insulation can, for example, be provided in the form of a band and wound onto the surface of the shrink-ring. A multi-layer material can be utilized, for example, a two-layer band in which one layer is mica or mica-containing paper, while the other layer is a plastic having an electrically, mechanically and thermally resistant character, preferably a polyimide. The insulating band is wound onto the shrink-ring in such manner that the mica or mica-containing layer is on the inside in contact with the surface of the ring while the polyimide layer is on the outside. This enables the shrink-ring to be heated up to the desired shrink temperature prior to application to the commutator segment assembly without damaging the quality of the insulation.

The insulating material 3 has a maximum thickness of approximately 0.5 mm so that it is for all practical purposes incompressible and thus does not present an unreliability factor in defining the shrinkage mass. The distances between the shrink-ring 1 and the voltage-carrying commutator segment parts 2 may be made very short so that the stress over the cross-section $x - x$ caused by the radially inward applied shrink force may be minimized, this for the reason that because of the complete insulation covering on the shrink-ring, as provided by the invention, the shrink-ring need not be disposed at a relatively great distance from the base 5 of the axially extending open groove in which the shrink-ring is inserted — which was formerly a requirement in the case where only the inner surface of the shrink-ring was insulated in order to prevent any possibility of a flashover between the shrink-ring and commutator segments.

Instead of a two-layer insulation material, one having three layers can be utilized, the inner layer being composed of mica or mica-containing paper, and the two outer layers being of plastic material, e.g. polyimide. In this manner, the mica or mica-containing paper layer is protected on both sides by the polyimide against any possible damage when the laminated insulating band is wound onto the shrink-ring.

It is also possible to make the insulating material from a polyimide coated with a synthetic fluorocarbon resin, weldable under heat and pressure. In this case, the resin layer is placed in contact with the shrink-ring and thus the insulating material will become tightly adhered to the shrink-ring when the latter is heated up prior to being shrunk onto the commutator segment assembly.

In order to achieve an even greater electrical reliability when higher operating voltages are used on the commutator assembly, it is also possible to utilize a ring of additional insulation material 6 interposed between the insulated shrink-ring 1 and the surface 4 of the commutator to which the shrink-ring is applied. The layer 7 which lies in contact with the insulation 3 on the shrink-ring is made from a mechanically strong and electrical insulating plastic, e.g. polyimide, or insulating paper, while the other layer 8 in contact with the surface 4 of the commutator is made from mica or mica-containing paper.

I claim:

1. An electrical commutator component of a dynamoelectric machine comprising a cylindrical assembly of commutator segments, and shrink-ring surrounding and exerting a compressive force on said commutator segment assembly, the entire surface area of said shrink-ring including insulation material thereon having a maximum thickness not exceeding approximately 0.5 mm thereby to render it substantially incompressible and consisting of two layers, the inner layer in actual contact with the surface of the shrink-ring being mica-containing paper and the outer layer being polyimide.

2. An electrical commutator component of a dynamoelectric machine comprising a cylindrical assembly of commutator segments, and a shrink-ring surrounding and exerting a compressive force on said commutator segment assembly, the entire surface area of said shrink-ring including insulation material thereon having a maximum thickness not exceeding approximately 0.5 mm thereby to render it substantially incompressible and comprising three layers, the inner layer being mica or mica-containing paper.

3. An electrical commutator component of a dynamoelectric machine comprising a cylindrical assembly of commutator segments, and a shrink-ring surrounding and exerting a compressive force on said commutator segment assembly, the entire surface area of said shrink-ring including insulation material thereon having a maximum thickness not exceeding approximately 0.5 mm thereby to render it substantially incompressible and consisting of three layers, the inner layer being mica or mica-containing paper and the two outer layers being polyimide.

* * * * *

UNITED STATES PATENT OFFICE
CERTIFICATE OF CORRECTION

PATENT NO. : 3,899,705
DATED : August 12, 1975
INVENTOR(S) :

It is certified that error appears in the above-identified patent and that said Letters Patent are hereby corrected as shown below:

In claim 1:
    line 10, after "being" insert:
    - mica or -

*Signed and Sealed this*

*thirtieth* Day of *September 1975*

[SEAL]

Attest:

RUTH C. MASON
*Attesting Officer*

C. MARSHALL DANN
*Commissioner of Patents and Trademarks*